US005805193A

United States Patent [19]

Follett et al.

[11] Patent Number: 5,805,193

[45] Date of Patent: Sep. 8, 1998

[54] DIE-PUNCH CUTTING APPARATUS FOR A CONTINUOUS WEB THERMAL PRINTING DEVICE

[75] Inventors: Paul S. Follett; Edward A. Nardone, both of Wakefield, R.I.

[73] Assignee: Atlantek, Inc., Wakefield, R.I.

[21] Appl. No.: 645,055

[22] Filed: May 13, 1996

Related U.S. Application Data

[63] Continuation-in-part of Ser. No. 224,166, Apr. 7, 1994, Pat. No. 5,565,902.

[51] Int. Cl.[6] .............................. B41J 2/315; B41J 2/32; B31F 1/07; B23D 25/02

[52] U.S. Cl. .............................. 347/171; 83/284; 101/28

[58] Field of Search .............................. 347/171; 346/24; 101/28, 29, 30, 31, 16, 17, 8, 9, 219, 228; 83/284, 922; 270/5.02, 21.1

[56] References Cited

U.S. PATENT DOCUMENTS

| | | | |
|---|---|---|---|
| 3,261,522 | 7/1966 | Auger et al. | 83/49 |
| 3,977,283 | 8/1976 | Helm | 83/341 |
| 4,506,824 | 3/1985 | Bartz | 83/76.8 |
| 4,716,802 | 1/1988 | O'Connor et al. | 83/313 |
| 5,017,257 | 5/1991 | Murphy | 83/209 |
| 5,017,412 | 5/1991 | Bekker-Madsen | 428/43 |
| 5,021,804 | 6/1991 | Nozawa et al. | 347/176 |
| 5,117,719 | 6/1992 | Takagi et al. | 83/640 |
| 5,218,380 | 6/1993 | Fiscella | 346/136 |
| 5,270,735 | 12/1993 | Fiscella et al. | 347/172 |

*Primary Examiner*—N. Le
*Assistant Examiner*—L. Anderson
*Attorney, Agent, or Firm*—Salter & Michaelson

[57] ABSTRACT

A die-punch cutting apparatus for a continuous web thermal printer consists of a die body having a longitudinal I-shaped cutting opening and a punch body having a longitudinal I-shaped cutting blade which is slidably received in interfitting engagement within the I-shaped cutting opening of the die body. The I-shaped cutting opening and cutting blade include first and second spaced longitudinal cutting edges symmetrically disposed on opposing sides of a longitudinal centerline, and further include terminal end portions which are outwardly rounded in configuration. In operation, the first and second cutting edges of the punch body are slidably engaged with the first and second cutting edges of the die body for severing a printed section of print media from a continuous web, wherein the first cutting edges of the die body and the punch body cooperate to cut rounded corners at the trailing edge of a previously printed section of media, and the second cutting edges of the die body and the punch body cooperate to cut rounded corners at the leading edge of a section of print media to be subsequently printed.

8 Claims, 3 Drawing Sheets

DIE-PUNCH CUTTING APPARATUS FOR A CONTINUOUS WEB THERMAL PRINTING DEVICE

CROSS-REFERENCE TO RELATED APPLICATIONS

This application is a continuation in part of U.S. application No. 08/224,166, filed Apr. 7, 1994, now U.S. Pat. No. 5,565,902 entitled THREE-PASS THERMAL DYE-TRANSFER COLOR PRINTER WITH CONTINUOUS WEB PRINT MEDIA.

BACKGROUND AND SUMMARY OF THE INVENTION

The instant invention relates to continuous web thermal color printers and more particularly to a die-punch apparatus for severing a section of the print media from the web.

Three-pass thermal color printers utilizing a continuous web of print media have heretofore been known in the art. In this regard, the U.S. Pat. Nos. to Nozawa et al No. 5,021,804; Fiscella et al No. 5,270,735; and Fiscella No. 5,218,380 represent the closest prior art to the subject invention of which the Applicant is aware.

The basic printing arrangement as taught by the prior art is illustrated in simplified form in prior art FIG. 1. A three-pass thermal color printer prints three separate primary colors in overlapping relation onto a thermal print media 10 to achieve a single full color image. In this connection, a roll 12 of transfer film 14 is provided with sequential sets of colored panels, i.e. Yellow, Magenta, Cyan, Yellow, Magenta, Cyan, etc. In each of the prior art printing devices cited above, the primary drive rollers 16 are situated downstream of the printhead 18, i.e. the printhead 18 is situated between the roll of print media 10 and the drive rollers 16 so that the print media 10 is drawn through the printhead 18 from the continuous web. In most cases a cutter mechanism 20 is provided at the outlet of the printing device for separating the printed section of the print media from the continuous web. In operation of the prior art printing devices, the drive rollers 16 draw the print media 10 through the printhead 18 in the direction of arrow 22 to print the first color. The printhead 18 is then lifted and the drive rollers 16 reverse to push the print media 10 backwardly in the direction of arrow 24 to its starting position in preparation for printing the next color in overlapping relation. The printhead 18 is lowered, the dye ribbon 14 advanced to the next color panel, and then the drive rollers 16 again draw the print media 10 through the printhead 18 to print the second color. The process is repeated for the third color to achieve a full color print. The print media 10 is then advanced outwardly of the printer and severed by the cutter mechanism 20 at cut line 26.

While the prior art printing devices are effective for producing high-quality color images, it has been found that there is a significant amount of print media 10 wasted for each image that is printed and separately removed from the printer, i.e. when the printer is used for single image, or one-up instant issue printing. When the prior art printers are used in single image printing, they effectively waste a length of print media equal to the distance between the print line 28 of the printhead 18 to the cutter mechanism 20 each time an image is printed. In reality, this can translate into several inches of wasted print media for each printed image removed from the printer.

The instant invention provides a three-pass thermal dye transfer color printer for printing a color image on a continuous web of print media which overcomes the media waste problems of the prior art printers. The instant thermal printer comprises a thermal print station comprising a thermal printhead and an associated printhead platen. The printhead has an upstream side positioned adjacent the roll of print media and an opposite downstream side. The thermal printer further comprises a set of drive rollers positioned between the printhead and the roll of print media. The drive rollers are operative for drawing the print media through the printhead in an upstream direction, i.e. toward the roll of print media, and advancing the print media in a downstream direction. In operation, the drive rollers draw the print media in an upstream direction whereby the printhead prints an image on the print media starting from a mid-point on the print media to the terminal end thereof. The drive rollers then advance the print media in a downstream direction so that the next printing operation can be overlayed onto the first printed image. The printer reciprocates the print media back and forth until three separate color images are overlayed to achieve a full color image. The drive rollers are further operative for advancing the print media in a downstream direction toward a cutting station wherein the media is severed at a mid-point to remove only the printed section of media from the web. By reversing the orientation of the printhead and reversing the direction of printing, the instant printer effectively eliminates all wasted print media when the printed image is severed from the continuous web.

Since the intended use of the present print system is for the production of identification cards, the instant invention further provides a die-punch cutting apparatus which is operative for cutting rounded corners as the printed section of print media is severed from the web. In this regard, the die-punch cutting apparatus comprises a die body having a longitudinal I-shaped cutting opening and a punch body having a longitudinal I-shaped cutting blade which is slidably received in interfitting engagement within the I-shaped cutting opening of the die body. Means are provided for moving the punch body between a resting position wherein the punch body is spaced above the die body for positioning the print media between the punch body and the die body and an operative cutting position wherein the punch body is slidably received in interfitting engagement within the cutting opening of the die body for severing the printed section of print media from the continuous web. The I-shaped cutting opening and cutting blade include first and second spaced longitudinal cutting edges symmetrically disposed on opposing sides of a longitudinal centerline, and further include terminal end portions which are outwardly rounded in configuration. In operation, the first and second cutting edges of the punch body are slidably engaged with the first and second cutting edges of the die body for severing a printed section of print media from a continuous web, wherein the first cutting edges of the die body and the punch body cooperate to cut rounded corners at the trailing edge of a previously printed section of media, and the second cutting edges of the die body and the punch body cooperate to cut rounded corners at the leading edge of a section of print media to be subsequently printed.

Accordingly, it is an object of the instant invention to provide a three-pass thermal dye transfer color printer with a continuous web of print media which does not waste print media.

It is another object to provide a three-pass thermal color printer which has a reversed direction of print.

It is still another object to provide a three-pass thermal color printer which is simple is design, easy to assemble, and inexpensive to manufacture.

It is yet another object to provide a continuous web printer in which the cutting apparatus includes an I-beam punch operative for rounding the corners of the print media when it is severed from the web.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
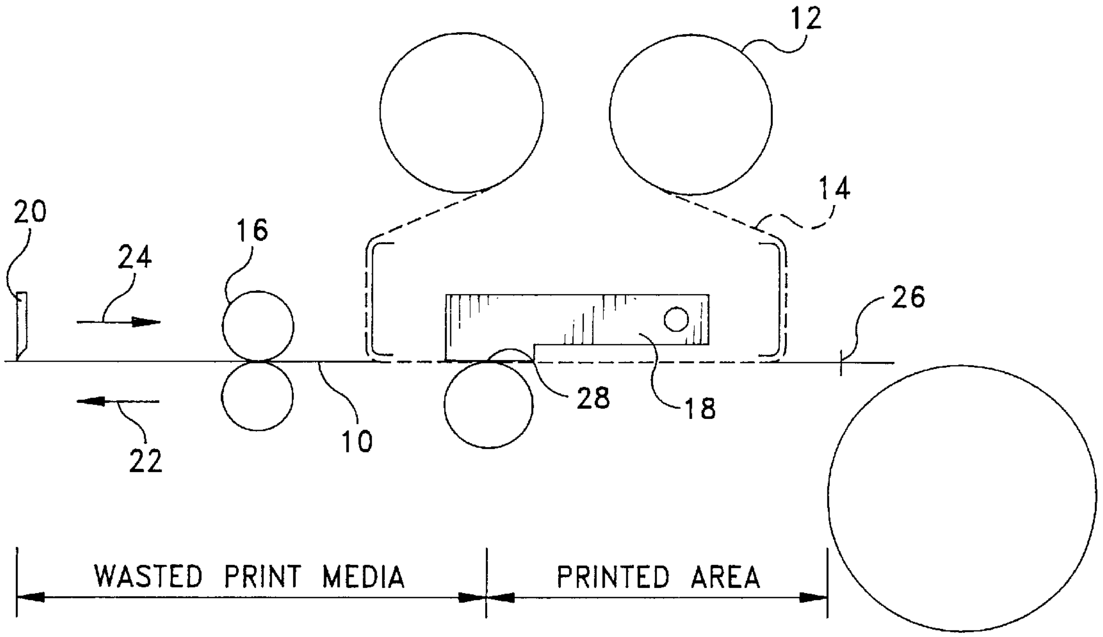
FIG. 1 (PRIOR ART)
FIG. 1 is a schematic view of the prior art printing arrangement.
Figure 2:
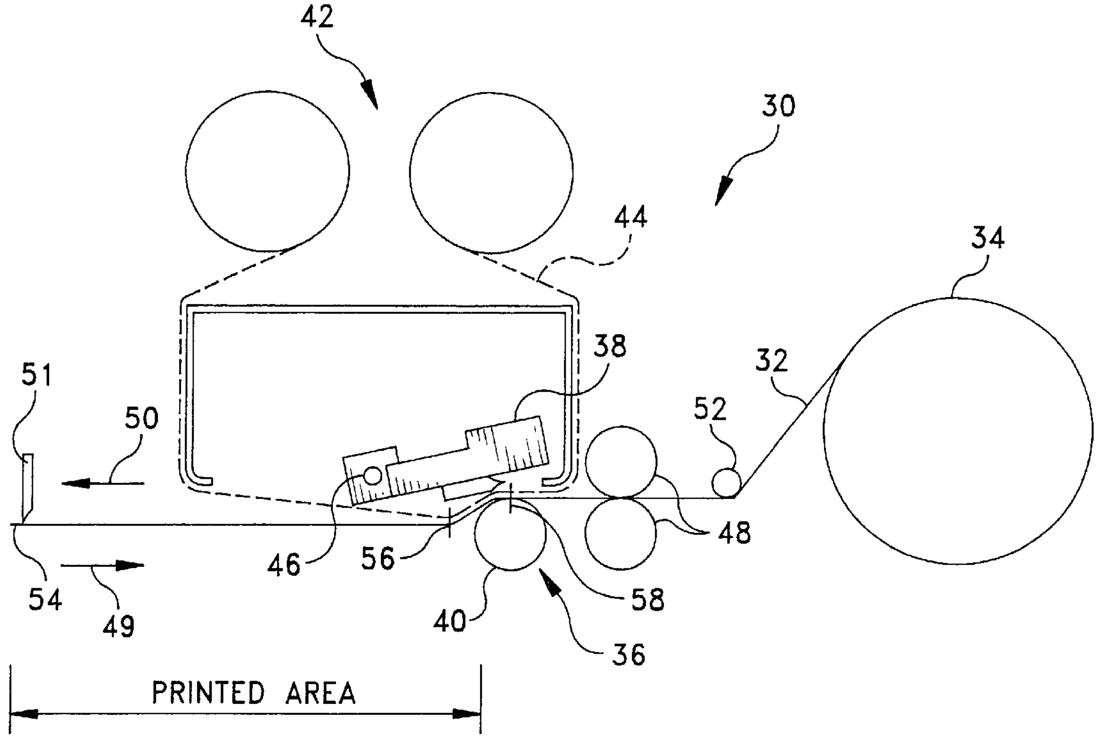
FIG. 2 is a schematic view of the printing device of the instant invention.
Figure 3:
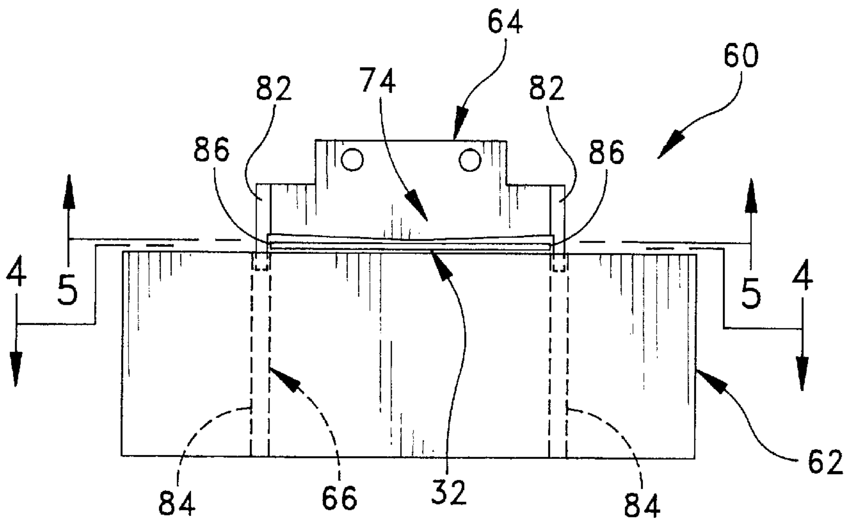
FIG. 3 is a front view of the die-punch cutting apparatus of the instant invention.
Figure 4:
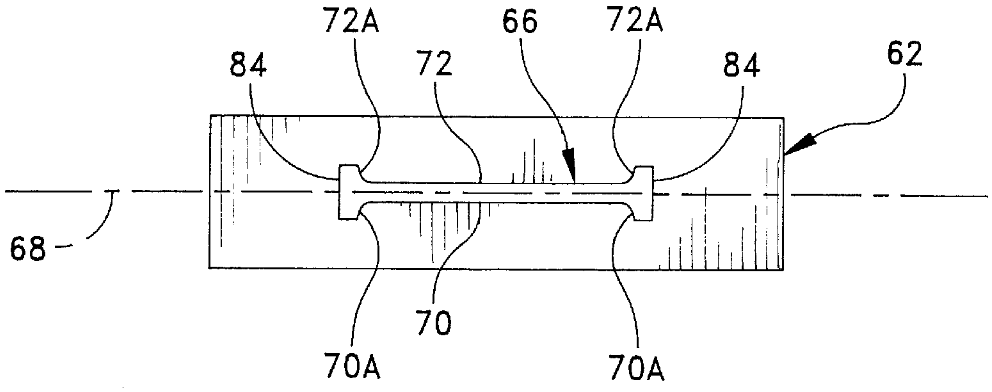
FIG. 4 is a cross-sectional view of the die body as taken along line 4—4 of FIG. 3.
Figure 5:
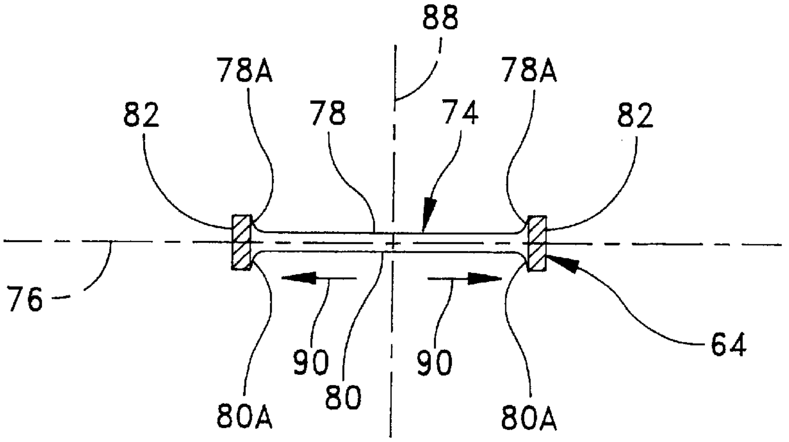
FIG. 5 is a cross-sectional view of the punch as taken along line 5—5 of FIG. 3.
Figure 6:
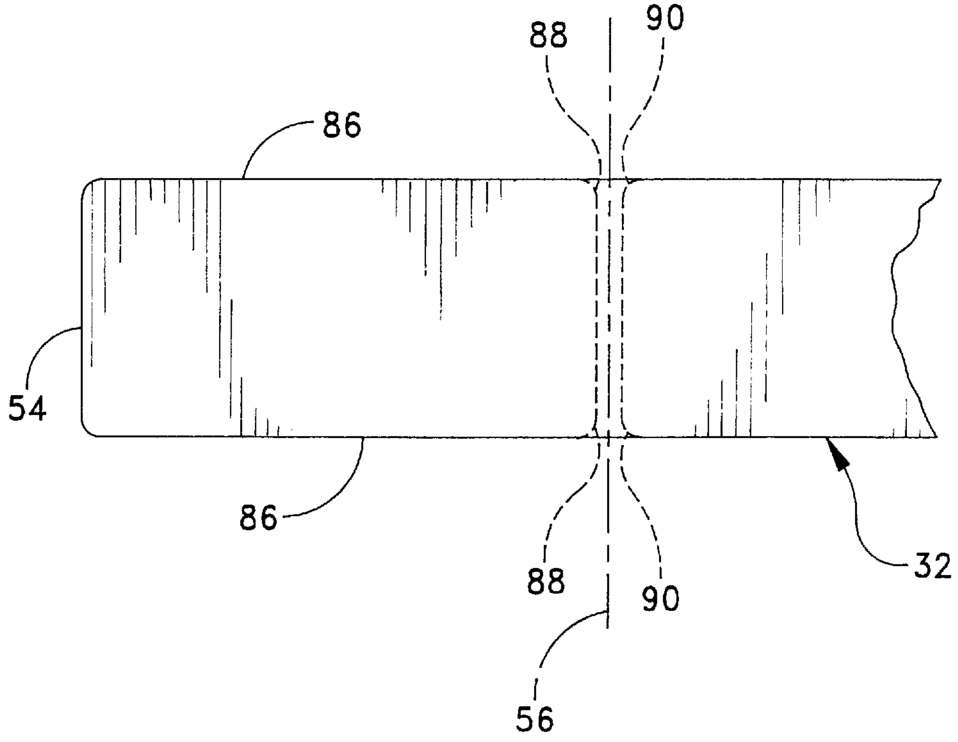
FIG. 6 is a top view of the print media showing the cutting lines of the cutting apparatus.

Referring now to drawing FIG. 2, the three-pass thermal dye transfer color printer of the instant invention is illustrated and generally indicated at 30. As will hereinafter be more fully described, the instant thermal printer 30 is operative for printing a full-color image onto a continuous web of print media 32. The print media 32 is preferably supplied in a roll 34 which is mounted in a print cabinet in a conventional manner.

The instant thermal printer 30 comprises a thermal print station generally indicated at 36 comprising a thermal printhead 38 and an associated printhead platen 40. The printhead 38 has an upstream side positioned adjacent the roll 34 of print media 32 and an opposite downstream side. The printer further includes a transfer film roll assembly generally indicated at 42. The film roll assembly includes a thermal dye transfer film 44 having sequential panels of Yellow, Magenta and Cyan dye. The roll assembly 42 is mounted in a conventional manner such that the film 44 passes between the printhead 38 and the thermal print media 32. The printhead 38 is mounted on a pivot 46 so that it is pivotably movable between a first position (not shown) wherein the printhead 38 is in biased engagement with the printhead platen 40, and a second position (FIG. 2) wherein the printhead 38 is spaced from the printhead platen. A cam mechanism (not shown) is operative for moving the printhead 38 between the first and second positions.

The thermal printer 30 further comprises a pair of drive rollers 48 positioned between the printhead 38 and the roll 34 of print media 32. The drive rollers 48 are operative for drawing the print media 32 in an upstream printing direction (arrow 49) when the printhead 38 is in the first position and for advancing the print media 32 in both the upstream direction (arrow 49) and the downstream direction (arrow 50) when the printhead 38 is in the second position. A cutting mechanism 51 is positioned downstream of the printhead 38 for severing the printed image from the print media 32. A guide roller 52 is positioned between the drive rollers 48 and the roll 32 to guide the print media 32 from the roll 34. The print media 32 is threaded through the print arrangement as illustrated in FIG. 2 so that a terminal end thereof 54 is positioned downstream of the printhead 38 adjacent to the cutter 51.

In operation, the printhead 38 is moved to the second (up) position (FIG. 2), and the drive rollers 48 initially advance the print media 32 in an upstream direction (arrow 49) so that the length of print media 32 downstream of the printhead 38 is equal to the length of the printed image. In this connection, the print media 32 is advanced upstream until point 56 is aligned with printline 58. The printhead 38 is then moved to the first (down) position and the print media 32 is drawn through the printhead 38 in an upstream direction, i.e. toward the media roll 34 (arrow 49), whereby the printhead 38 thermally prints an image on the print media 32 starting from mid-point 56 on the print media 32 to the terminal end 54. The printhead 38 is thereafter pivoted to the up position and the drive rollers 48 then advance the print media 32 in a downstream direction (arrow 50) so that the next printing operation can be overlayed onto the first printed image. The printer 30 repeats the printing procedure until three separate color images are overlayed to achieve a full-color image.

After the three printing operations are completed, the drive rollers 48 advance the print media 32 in a downstream direction (arrow 50) until mid-point 56 is positioned underneath the cutter 51 for severing the printed area from the roll of print media 32. In this regard, mid-point 56 also comprises the cut line for severance from the roll.

It is contemplated that one of the most significant uses of this apparatus will be in the printing of identification cards, and in this regard, it is considered to be a significant advantage if the print media could be severed from the web already having the desired rounded corners as conventionally provided on cards. The prior art severing mechanisms such as shown at 51 provides a straight edge cut, and then when the card is removed from the apparatus it must undergo a separate die cutting operation to form the rounded corners.

Referring now to FIGS. 3–7, the instant invention further provides a die-punch cutting apparatus generally indicated at 60 which operative for cutting rounded edges as the printed section of the print media 32 is severed from the continuous web 34. The die-punch cutting apparatus 60 comprises a die body generally indicated at 62 and a punch body generally indicated at 64.

The die body 62 is generally rectangular in shape and includes a longitudinal I-shaped cutting opening generally indicated at 66. The I-shaped cutting opening 66 extends along a longitudinal centerline 68 of the die body 62 and includes first and second spaced longitudinal cutting edges 70, 72 respectively, which are symmetrically disposed on opposing sides of the longitudinal centerline 68. The first and second longitudinal cutting edges 70, 72 each include opposing terminal end portions 70A, 72A which are outwardly rounded in configuration.

The punch body 64 is also generally rectangular in shape and includes a longitudinal I-shaped cutting blade generally indicated at 74 which is slidably received in interfitting engagement within the I-shaped cutting opening 66 of the die body 64. The I-shaped cutting blade 74 extends along a longitudinal centerline 76 of the punch body 64 and includes first and second spaced longitudinal cutting edges 78, 80 respectively, which are symmetrically disposed on opposing sides of the longitudinal centerline 76. The cutting edges 78, 80 each include opposing terminal end portions 78A, 80A which are outwardly rounded in configuration.

The punch body 64 further includes guide bars 82 at the terminal end portions of the cutting edges 78, 80. The guide bars 82 are slidably received in guide channels 84 formed in the die body 62 at the terminal end portions of the cutting edges 70, 72. In operation, the guide bars 82 engage the longitudinal side edges 86 of the print media 32 to guide the print media 32 through the cutting apparatus 60.

The punch body 64 is further defined by a lateral centerline 88 wherein the first and second cutting edges 78, 80 angle upwardly from the lateral centerline 88 toward the terminal ends portions such that cutting is effected in an outward direction starting from the lateral centerline 88 and ending at the outer terminal end portions (See arrows 90).

In use with the printing device 30 as previously described, the cutting device 60 is secured to the frame of the device 30 adjacent to the outlet of the device so that the continuous web 32 passes within the guide opening formed between the punch body 64 and die body 62. Means (not shown) are provided within the device 30 for selectively moving the punch body 64 between a resting position wherein the punch body 64 is spaced above the die body 62 for positioning the print media 32 between the punch body 64 and the die body 62, and an operative cutting position (not shown) wherein the punch body 64 is slidably received in interfitting engagement within the cutting opening 66 of the die body 62 for severing the printed section of print media 32 from the continuous web 34.

In a cutting operation, the first and second cutting edges 78, 80 of the punch body 64 are slidably engaged with the first and second cutting edges 70, 72 of the die body 62 for severing a printed section of print media from a continuous web. The printed section of the print media is defined as previously described, i.e. between the mid-point 56 and the terminal end 54. The first cutting edges 70, 78 of the die body 62 and the punch body 62 cooperate to sever the print area from the web 34 along the mid-point 56, and to cut rounded corners 88 at the trailing edge of the previously printed section of media. The second cutting edges 72, 80 of the die body 62 and the punch body 64 also cooperate to cut rounded corners 90 at the leading edge of a section of print media 32 to be subsequently printed. The waste derived from the cutting operation is very small and is shaped in the same profile as the shape of the cutting blade 74.

It can therefore be seen that the instant invention provides a novel three-pass thermal dye transfer printer which overcomes the disadvantages of the prior art. By reversing the orientation of the printhead and reversing the direction of printing, the instant printer effectively eliminates all wasted print media when the printed image is severed from the continuous web, and allows the media to be cut or cropped to the edge of the printed image. Furthermore, the cutting apparatus of the invention effectively severs the printed area from the web while also being operative for forming rounded corners at the trailing edge of the printed portion and at the leading edge of the next section of media to be printed. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. A printing device for one-up instant issue printing of a single image on a continuous web of print media comprising:

a continuous web of print media;

print means for printing an image from a mid-point on said print media to a terminal end point of said print media;

drive means for driving said continuous web of print media in upstream and downstream directions through said print means; and cutting means for severing said print media at said mid-point, said cutting means comprising a die body having a longitudinal I-shaped cutting opening, said I-shaped cutting opening having a longitudinal centerline and first and second spaced longitudinal cutting edges symmetrically disposed on opposing sides of said longitudinal centerline, said first and second longitudinal cutting edges including terminal end portions which are outwardly rounded in configuration, said cutting means further comprising a punch body having a longitudinal I-shaped cutting blade which is slidably received in interfitting engagement within the I-shaped cutting opening of the die body, said I-shaped cutting blade having a longitudinal centerline and first and second spaced longitudinal cutting edges symmetrically disposed on opposing sides of said longitudinal centerline, said longitudinal cutting edges including terminal end portions which are outwardly rounded in configuration, said first and second cutting edges of said punch body being slidably engagable with said first and second cutting edges of said die body for severing a printed section of print media from a continuous web, wherein said first cutting edges of said die body and said punch body cooperate to cut rounded corners at the trailing edge of a previously printed section of media, and said second cutting edges of the die body and said punch body cooperate to cut rounded corners at the leading edge of a section of print media to be subsequently printed.

2. The printing device of claim 1 wherein said punch body includes guide bars at the terminal end portions of said cutting edges of said punch, said guide bars being slidably received in guide channels formed in said die body at the terminal end portions of said cutting edges, said guide bars engaging longitudinal side edge of the print media to guide the print media through the cutting apparatus.

3. The printing device of claim 1 wherein said punch body has a lateral centerline, said first and second cutting edges tapering angling upwardly from said lateral centerline toward said terminal ends portions such that cutting is effected starting from said lateral centerline and ending at said terminal end portions.

4. The printing device of claim 2 wherein said punch body has a lateral centerline, said first and second cutting edges tapering angling upwardly from said lateral centerline toward said terminal ends portions such that cutting is effected starting from said lateral centerline and ending at said terminal end portions.

5. A die-punch cutting apparatus for a continuous web printing device comprising:

a die body having a longitudinal I-shaped cutting opening, said I-shaped cutting opening having a longitudinal centerline and first and second spaced longitudinal cutting edges symmetrically disposed on opposing sides of said longitudinal centerline, said first and second longitudinal cutting edges including terminal end portions which are outwardly rounded in configuration; and a punch body having a longitudinal I-shaped cutting blade which is slidably received in interfitting engagement within the I-shaped cutting opening of the die body, said I-shaped cutting blade having a longitudinal centerline and first and second spaced longitudinal cutting edges symmetrically disposed on opposing sides of said longitudinal centerline, said longitudinal cutting edges including terminal end portions which are outwardly rounded in configuration, said first and second cutting edges of said punch body being slidably engagable with said first and second cutting edges of said die body for severing a printed section of print media from a continuous web, wherein said first cutting edges of said die body and said punch body cooperate to cut rounded corners at the trailing edge of a previously printed section of media, and said second cutting edges of the die body and said punch body cooperate to cut rounded corners at the leading edge of a section of print media to be subsequently printed.

6. The die-punch cutting apparatus of claim 5 wherein said punch body includes guide bars at the terminal end portions of said cutting edges of said punch, said guide bars being slidably received in guide channels formed in said die body at the terminal end portions of said cutting edges, said guide bars engaging longitudinal side edge of the print media to guide the print media through the cutting apparatus.

7. The die-punch cutting apparatus of claim 5 wherein said punch body has a lateral centerline, said first and second cutting edges tapering angling upwardly from said lateral centerline toward said terminal ends portions such that cutting is effected starting from said lateral centerline and ending at said terminal end portions.

8. The die-punch cutting apparatus of claim 6 wherein said punch body has a lateral centerline, said first and second cutting edges tapering angling upwardly from said lateral centerline toward said terminal ends portions such that cutting is effected starting from said lateral centerline and ending at said terminal end portions.

* * * * *